(12) United States Patent
Aliman et al.

(10) Patent No.: US 12,461,008 B2
(45) Date of Patent: Nov. 4, 2025

(54) PARTICLE DETECTOR FOR DETECTING CHARGED PARTICLES

(71) Applicant: Leybold GmbH, Cologne (GB)

(72) Inventors: Michel Aliman, Oberkochen (DE); Alexander Laue, Cologne (DE)

(73) Assignee: Leybold GmbH, Cologne (DE)

( * ) Notice: Subject to any disclaimer, the term of this patent is extended or adjusted under 35 U.S.C. 154(b) by 30 days.

(21) Appl. No.: 17/906,128

(22) PCT Filed: Mar. 8, 2021

(86) PCT No.: PCT/EP2021/055787
§ 371 (c)(1),
(2) Date: Sep. 12, 2022

(87) PCT Pub. No.: WO2021/180653
PCT Pub. Date: Sep. 16, 2021

(65) Prior Publication Data
US 2023/0114569 A1  Apr. 13, 2023

(30) Foreign Application Priority Data
Mar. 13, 2020  (DE) ..................... 10 2020 203 234.3

(51) Int. Cl.
*G01N 15/1031* (2024.01)
*G01N 15/10* (2024.01)
*H01J 49/02* (2006.01)

(52) U.S. Cl.
CPC . *G01N 15/1031* (2013.01); *G01N 2015/1024* (2024.01); *H01J 49/025* (2013.01)

(58) Field of Classification Search
CPC ................... G01N 15/1031; G01N 2015/1024
See application file for complete search history.

(56) References Cited

U.S. PATENT DOCUMENTS

| | | | |
|---|---|---|---|
| 9,997,325 B2 * | 6/2018 | Hosch | H01J 37/32935 |
| 2001/0054686 A1 | 12/2001 | Torti et al. | |
| 2005/0274888 A1 | 12/2005 | Darling et al. | |

(Continued)

FOREIGN PATENT DOCUMENTS

| | | |
|---|---|---|
| CN | 101496130 A | 7/2009 |
| EP | 3340276 A1 | 6/2018 |

(Continued)

OTHER PUBLICATIONS

Leo, Techniques for Nuclear and Particle Physics Experiments, Chapters 1-2, 76 pages, 1987.

(Continued)

*Primary Examiner* — Reena Aurora
(74) *Attorney, Agent, or Firm* — Theodore M. Magee; Westman, Champlin & Koehler, P.A.

(57) ABSTRACT

The invention relates to a particle detector, comprising: a measuring electrode for measuring charged particles, a detection device for detecting the charged particles measured by the measuring electrode, and an evaluation device for determining the number of charged particles detected by the detection device. The detection device has a charge amplifier for converting a charge signal generated by the charged particles into a voltage signal and an amplifier device for amplifying the voltage signal.

12 Claims, 6 Drawing Sheets

(56) References Cited

U.S. PATENT DOCUMENTS

2008/0073548 A1 3/2008 Denton et al.
2017/0350862 A1* 12/2017 Hochgreb ................. B03C 3/47

FOREIGN PATENT DOCUMENTS

GB          2552232   A   1/2018
TW        201801788   A   1/2018

OTHER PUBLICATIONS

Leo, Techniques for Nuclear and Particle Physics Experiments, Chapters 3-4, 54 pages, 1987.
Leo, Techniques for Nuclear and Particle Physics Experiments, Chapters 5-6, 44 pages, 1987.
Leo, Techniques for Nuclear and Particle Physics Experiments, Chapters 7-8, 44 pages, 1987.
Leo, Techniques for Nuclear and Particle Physics Experiments, Chapters 9-12, 75 pages, 1987.
Leo, Techniques for Nuclear and Particle Physics Experiments, Chapters 13-14, 42 pages, 1987.
Leo, Techniques for Nuclear and Particle Physics Experiments, Chapter 15, 16 pages, 1987.
Leo, Techniques for Nuclear and Particle Physics Experiments, Chapters 16-18, 38 pages, 1987.
Strehl, Beam Instrumentation and Diagnostics, Particle Acceleration and Detection, Introduction, 13 pages, 2006.
Strehl, Beam Instrumentation and Diagnostics, Beam Intensity Measurement, Chapter 2, 64 pages, 2006.
Strehl, Beam Instrumentation and Diagnostics, Beam Profile Measurement, Chapter 4, 53 pages, 2006.
Strehl, Beam Instrumentation and Diagnostics, Measurements with Capacitive or Inductive Pickups, Chapter 5, 61 pages, 2006.
Strehl, Beam Instrumentation and Diagnostics, Measurements in Phase Spaces, Chapter 6, 75 pages, 2006.
German Office Action dated Nov. 16, 2020 for corresponding German application Serial No. 10 2020 203 234.3, 10 pages.
PCT Notification of Transmittal of the International Search Report and the Written Opinion of the International Searching Authority, or the Declaration, International Search Reports and Written Opinion dated May 27, 2021 for corresponding PCT application Serial No. PCT/EP2021/055787, 12 pages.
Mass spectrometry, Wikipedia, https://en.wikipedia.org/w/index.pp?title=mass_spectrometry&oldid=944008304, 24 pages, 2020.
Pfeifer et al., Low power readout electronics for a UV MCP detector with cross strip anode, Journal of Instruments, 10 pages, 2014.
Ring et al., Fourier Transform Time-of-Flight Mass Spectrometry in an Electrostatic Ion Beam Trap, Analytical Chemistry, vol. 72, No. 17, pp. 4041-4046, 2000.
Wiza, Microchannel Plate Detectors, Nuclear Instruments and Methods, vol. 162, pp. 587-601, 1979.
Taiwanese Search Report dated Aug. 24, 2024 for corresponding Taiwanese application Serial No. 110109022, 1 page.
Japanese Notification of Reason for Rejection dated Oct. 28, 2024 for corresponding Japanese application Serial No. 2022-554869, 7 pages.
Chinese First Office Action dated Apr. 24, 2025 and Search Report dated Apr. 21, 2025 for corresponding Chinese application Serial No. 202180020737.8, 18 pages.

\* cited by examiner

PARTICLE DETECTOR FOR DETECTING CHARGED PARTICLES

CROSS-REFERENCE OF RELATED APPLICATION

This application is a Section 371 National Stage Application of International Application No. PCT/EP2021/055787, filed Mar. 8, 2021, which is incorporated by reference in its entirety and published as WO 2021/180653 A1 on Sep. 16, 2021, the content of which is hereby incorporated by reference in its entirety and which claims priority of German Application No. 10 2020 203 234.3, filed Mar. 13, 2020.

BACKGROUND

The invention relates to a particle detector, comprising: a measuring electrode for measuring charged particles, a detection device for detecting the charged particles measured by the measuring electrode, and an evaluation device for determining the number of charged particles detected by the detection device.

Particle detectors are mainly used in the mass spectrometer range (MS range) to detect or count particles. The charged particles generated and extracted in the fine or high vacuum range are accelerated to a suitable measuring or collecting electrode and detected there with the aid of a detection device. There are various methods for detecting charged particles (e.g. ions): charged particles can be detected by induction charge measurement (non-destructive) or by particle collision (destructive).

A distinction is made between two methods for destructive particle detection:
  Current detection of charged particles, e.g. using a Faraday cup
  Detection of particles through electron multiplication using an electron tube With Faraday cups, small dynamic ranges (up to 3 decades) are achieved. For larger dynamic ranges (up to 5-6 decades), so-called active charge multipliers such as dynodes, channel electron multipliers (Channeltrons) or secondary electron multipliers (SEMs) and microchannel plates (MCPs) are used, see for example the articles "Microchannel plate detectors," J. L. Wiza, Nuclear Instruments and Methods, Vol. 162, Issues 1-3,1-15, 1979, pp. 587-601 or "Low power readout electronics for a UV MCP detector with cross strip anode," M. Pfeifer et al., Journal of Instrumentation, Vol. 9, March 2014.

With regard to the measurement of particle currents in general, reference is made to the books "Beam instrumentation and diagnostics" by P. Strehl, Springer, Berlin 2006, as well as "Techniques for Nuclear and Particle Experiments: A How-to Approach.," Springer, New York 1994.

The problem with charge multipliers is the large drift and degradation during long-term operation. In the case of MCPs, for example, the amplification must be continuously readjusted due to permanent irreversible failures of the microchannels by continuously increasing the high acceleration voltage. Finally, the charge multiplier must be replaced after a short operating time from an application perspective. Faraday cups, on the other hand, are very robust and show hardly any measurable drift and degradation, but currently known measuring arrangements only achieve small dynamic ranges.

In summary, the detection of charged particles by means of current measurement using a Faraday cup or collecting electrode with high robustness and stability is possible, although the sensitivity is lower than when detecting charged particles by means of a charge multiplier.

On the other hand, the dynamic range of particle detection using a charge multiplier is up to three decades larger than the detection dynamics using a Faraday cup. In addition, as a result of the current measurement of these charge multipliers, the sensitivity to particles with high masses decreases discriminatively with this type of detection. The sensitivity of the charge multiplier is inversely proportional to the square root of the mass-to-charge ratio m/z.

The discussion above is merely provided for general background information and is not intended to be used as an aid in determining the scope of the claimed subject matter. The claimed subject matter is not limited to implementations that solve any or all disadvantages noted in the background.

SUMMARY

This object is achieved by a particle detector of the above-mentioned type, wherein the detection device has a charge amplifier for converting a charge signal generated by the charged particles into a voltage signal and an amplifier device for amplifying the voltage signal.

In the particle detector according to the invention, unlike conventional particle detectors which have a measuring electrode in the form of a Faraday cup, the current of the charged particles is not measured and evaluated with the aid of an electrometer, but rather a charge signal generated by the charged particles is converted into a voltage signal with the aid of a charge amplifier. In this way, the particle detector can be used to detect individual particles with a high degree of robustness and stability, as is the case with a detector with a measuring electrode in the form of a Faraday cup. With the aid of the amplifier device, the voltage signal is also amplified in order to ensure a dynamic range of up to 5-6 decades. In contrast to a charge multiplier, however, it is not the individual charges that are amplified in order to generate the large dynamic range, but rather the voltage signal generated by the charge amplifier.

The particle detector according to the invention is able to detect individual charged particles and to determine the number of particles accelerated to the measuring electrode or their total charge. The detection device is typically designed in the form of an electronic circuit for processing analog signals. The detection device should preferably be arranged or attached as close as possible to the measuring electrode.

The evaluation device is typically an electronic unit that is designed to digitally process signals. The evaluation device reads the outputs of the detection device and evaluates their status or results in order to determine the number of charged particles detected.

The evaluation device can be designed to control the detection device, for example the amplifier device, as will be described in more detail below.

In one embodiment, the evaluation device is designed to evaluate the voltage signal in a respective counting window around a measuring or impinging time of the charged particles at the measuring electrode in order to determine the number of charged particles detected. As has been described above, the particle detector described here does not measure the current, but rather individual charges or quantities of particles that are collected by the measuring electrode at certain measuring times. In other words, "collisions" of individual particles or of a plurality of particles at the measuring electrode are detected at the measuring times, which lead to a voltage jump in the voltage signal. The respective counting window typically has two halves, one of which is before and the other after the measuring time of the charged particles. However, the measuring time does not necessarily have to be in the middle of the counting window. A typical duration of the counting window is on the order of microseconds or less.

The evaluation device can read out the amplified, analog voltage signal at an output of the amplifier device and convert it into a digital voltage signal for digital evaluation or further processing. For this purpose, the analog voltage signal can be sampled by the evaluation device with a suitable sampling frequency $f_s$, for which the following applies: $f_s >> f_2$, wherein $f_2$ represents an upper frequency of a frequency range of interest (see below).

In a further development of this embodiment, the detection device has a trigger unit, typically in the form of a trigger circuit, for defining the respective counting window. To define the counting window, the trigger circuit switches between two binary states, wherein the switch takes place when the voltage signal exceeds or falls below a threshold value. The trigger circuit can have a filter, for example in the form of a bandpass filter, in order to filter out the frequency range relevant for triggering.

The trigger circuit can have an amplifier as well as a threshold switch, for example in the form of a Schmitt trigger, which switches between the two different switching states at two different threshold values of the voltage signal and in this way defines the duration of the respective counting window. The duration of a respective counting window can fluctuate slightly as a result of the triggering, i.e. it is not necessarily constant.

The trigger circuit is connected downstream of the amplifier device in the detection circuit and also supplies an analog trigger signal at its output, which is read out by the evaluation device and which generates a pulse for each particle collision or for each voltage jump. The trigger signal thus provides information about the number of particle collisions at the measuring electrode.

Instead of the trigger circuit described here, the triggering can be carried out to define a respective counting window on the digitized voltage signal in the evaluation device. If there are a large number of collisions at the measuring electrode in rapid succession, the digital evaluation of the voltage signal may not be fast enough to carry out the triggering.

Preferably, wherein the counting window defined by the trigger device is shifted in time preferably by the evaluation device to later times such that the counting window is around the respective measuring time or collision time. In particular, the counting window is shifted by half its length in order to bring the collisions time or measuring time in the middle of the counting window.

In both cases described above, i.e. both with analog and digital triggering, a counting window $dT_i$ ($dT_i/2$ before and after) can thus be taken from the voltage signal for each particle collision at a collision time or a measuring time $T_i$. Within the counting window, the evaluation device can calculate the quantity or number of particles in accordance with a suitable algorithm (see below). The corresponding algorithm is only carried out in the specified time windows $dT_i$ ([$T_i-dT_i/2$, $T+dT_i/2$]) around the respective collision time $T_i$, in order to minimize noise and disturbances when determining the number of charged particles.

In a further development, the evaluation device is designed to filter the voltage signal in the respective counting window in order to increase the signal-to-noise ratio. In this development, the voltage signal is digitally filtered within the respective counting window. The digital filtering can be, for example, a sliding averaging of the voltage signal. Since the voltage signal is very noisy in the case of weak collisions (i.e. a collision with a small quantity of particles at the measuring electrode), it can also be advantageous to determine the typical shape of the collision signals in the evaluation device as a convolution term in order to apply known algorithms for filtering, e.g. wavelet or Fourier-based algorithms. An improvement in the signal-to-noise ratio can be achieved, which can be at least a factor of 10 dB or 20 dB, for example, by means of sliding averaging or by another noise-reducing measurement data algorithm that may be used.

In a further development, the evaluation device is designed to determine a voltage difference in the voltage signal before the measuring time and after the measuring time in order to determine the number of charged particles detected in a respective counting window. In the respective counting window, the difference between the—typically filtered—voltage signal before the measuring time (base level) and after the measuring time is determined. To determine the number or the total charge $Q_N$ of the collected particles, the sum is formed from the charges collected $Q_i$ in the respective counting windows, which is proportional to the voltage difference calculated in the respective counting window. With a charge-to-voltage conversion factor CF of the charge amplifier, which can, for example, be on the order of approx. 100 nV/As, the following results:

$$Q_N = \sum_{i=1}^{N} Q_i = \sum_{i=1}^{N} \frac{U_i}{10^{Nx} \cdot CF}$$

wherein $10^{Nx}$ denotes the amplification factor of the amplifier device.

In a further embodiment, the evaluation device is designed to evaluate the voltage signal after the measuring time at a sampling time $t_{s,i}$ within the respective counting interval in order to determine the voltage difference, for which the following applies: $3/f_0 < t_{s,i} < 4.5/f_0$, wherein $f_0$ denotes a (passage) resonance frequency of the charge amplifier. Since the voltage signal slowly decreases after the voltage jump, the sampling time should not be selected too late in order not to falsify the measurement result. The sampling time should also not be selected too late, since further particles may then impinge on the measuring electrode. However, the sampling time point should not be selected too early, either, since the charge amplifier has a transient reaction and, in order to determine the voltage difference, one should wait until the charge amplifier has reached a steady state. At a passage resonance frequency of, for example, approx. 10 MHz, a suitable value for the sampling time $t_{s,i}$ is, for example, between approx. 300 ns and approx. 450 ns after the start of the counting window $dT_i$.

In one embodiment, the charge amplifier is a low-noise charge amplifier which has a signal-to-noise ratio greater than 10 dB in a predetermined frequency interval. The charge amplifier typically represents the first stage of the detection device, which is connected to the measuring electrode. The signal-to-noise ratio (SNR) of the low-noise charge amplifier should preferably be greater than 10 dB in a frequency range of interest [$f_1$, $f_2$] between a first frequency $f_1$ and a second frequency $f_2$ (i.e. SNR>3: SNR=10^(SNR_dB/20) with SNR_dB=10).

The signal-to-noise ratio in the frequency range of interest $[f_1, f_2]$ results as follows:

$$SNR = \frac{\Delta u_Q}{u_N} = \frac{\Delta u_Q}{\sqrt{\int_{f_1}^{f_2} e_N^2 \, df}}$$

wherein $\Delta U_Q$ denotes the useful voltage signal (in V) and $e_N^2$ denotes the noise component (in V/Hz) caused by the charge amplifier. The lower frequency $f_1$ of the frequency range of interest is typically on the order of kHz, for example from approx. 20-100 kHz; the upper frequency $f_2$ of the frequency range of interest is typically on the order of MHz, for example 15 MHz or above. The charge amplifier can have a passage resonance frequency $f_0$, for example on the order of approx. 10 MHz.

In a further embodiment, the charge amplifier has a phase margin of at least 45°, preferably of at least 60°. In order to keep overshoots low, the phase margin of the charge amplifier should not fall below a value of approx. 45°. This is particularly advantageous since the evaluation of the voltage signal should take place at a sampling time that is not too far away from the measuring time at which the charged particles impinge on the measuring electrode.

In a further embodiment, the amplifier device has an amplification factor which is adjustable by means of the evaluation device as a function of the voltage signal or its signal level. If the measuring times are far enough apart, the voltage signal or the level at the output of the amplifier device returns to the output level or to the output potential. In the case of closely successive impinging times, the voltage signal at the output of the amplifier arrangement increases steadily, however, the incline is always lower—in the worst case initially an almost logarithmic increase—so that the base level (baseline) increases more and more slowly over time. However, the voltage signal at the output of the amplifier arrangement always returns to the initial potential in the long term. It is therefore advantageous if the amplification factor of the amplification device is specified or adjusted by the evaluation device as a function of the signal level of the voltage signal. When choosing a suitable, non-overdriving amplification factor $10^{Nx}$ for the amplifier device as a function of the level of the signal level of the voltage signal, a dynamic range of the particle detector that extends over 4 or 5 decades can be achieved.

In a further development, the amplification factor of the amplifier device is adjustable over at least four decades, preferably over at least five decades.

A suitable adjustment of the amplification factor as a function of the value or level of the voltage signal can achieve a dynamic range of the particle detector of approx. 5 decades. For adjusting the amplification factor over 4 or 5 decades, the amplifier device typically has several (e.g. 4 or 5) amplifier stages connected in series. For example, a respective amplifier stage can have an amplification factor of $10^1$, so that a maximum amplification factor of $10^N$ results with a number of N amplifier stages. It is understood that an amplifier stage can also have a different amplification factor, e.g. $0.5 \times 10^1$, $2 \times 10^1$, etc. The evaluation device can typically switch the individual amplifier stages on or off in order to increase or decrease the amplification factor by one order of magnitude ($10^1$). The evaluation device can also carry out an automatic offset adjustment of the outputs of the individual amplifier stages at the start of a respective measurement or, if necessary, reset individual amplifier stages from overdrive to readiness for measurement.

In a further embodiment, the measuring electrode is designed as a Faraday cup. A Faraday cup is a conductive hollow body (metal cup). The Faraday cup ensures that all charged particles sucked in through a suitable input aperture can be picked up by the detection device, which is connected to the Faraday cup, with practically no backscattering.

With a Faraday cup, particle currents in the fA range can be detected, which corresponds to a particle current of approx. 1000 particles/s. Thanks to the high robustness of the Faraday cup, it is often used in corrosive or oxidative environments or at high particle beam densities or high temperatures.

The Faraday cup also offers high absolute accuracy of the measured signal, high long-term stability and low drift. Since the charge of the particles is measured directly, the Faraday cup also shows no mass discrimination, i.e. no sensitivity dependent on the particle size (including the mass of the molecular ion). High voltages are not required for the operation of the Faraday cup. This makes it particularly suitable for applications in the fine vacuum to ultra-high vacuum range as well as for applications in which strong electrical fields cannot be tolerated. The Faraday cup or a particle detector equipped with a measuring electrode in the form of a Faraday cup can be used in particular in the field of mass spectrometry, for example in residual gas analyzers (RGAs).

With a measuring electrode in the form of a Faraday cup, a destructive measurement is carried out by collecting the charged particles. Alternatively, the measuring electrode can be used for non-destructive detection or induction charge measurement of charged particles which do not come into contact with the measuring electrode themselves. The measuring electrode can be used, for example, for the non-destructive detection of charged particles in the form of ions in an ion trap mass spectrometer; however, similarly to the Faraday cup, it can also be used for the destructive detection of particles.

In a further embodiment, the particle detector comprises an extraction device for extracting the charged particles from the environment of the particle detector. For this purpose, the extraction device generally has an aperture with an aperture opening through which the charged particles can reach the particle detector. The aperture opening is usually on a line of sight with the measuring electrode or with an aperture opening located there, for example the aperture opening of a Faraday cup. In the event that a source of the charged particles is arranged in the environment of the particle detector, the line of sight of the particle detector is aligned with this particle source. The line of sight is not absolutely necessary; in a further embodiment, the particle beam can be deflected electromagnetically to the Faraday cup.

In a further embodiment, the particle detector comprises a particle guide device for guiding the charged particles from the extraction device to the measuring electrode. The particle guide device can be, for example, ion optics or the like. The provision of the particle guide device can be dispensed with if the path from the extraction device to the measuring electrode is small compared to the mean free path.

In a further embodiment, the extraction device and/or the particle guide device is designed to filter the charged particles. Both the particle guide device and the extraction device can filter the charged particles. For example, the extraction device can be designed as an ion filter device in the form of a so-called Nielsen grid with metal grid structures. The particle guide device can provide a filtering of the charged particles, for example by a Fourier-based filtering method.

Further features and advantages of the invention shall emerge from the following description of exemplary embodiments of the invention, with reference to the drawings which show details essential to the invention, and from the claims. The individual features can each be implemented individually or collectively in any combination in an embodiment of the invention.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are shown in the schematic drawings and are explained in the following description. In the drawings.

DETAILED DESCRIPTION

In the following description of the drawings, identical reference symbols are used for identical or functionally identical components.

Figure 1:
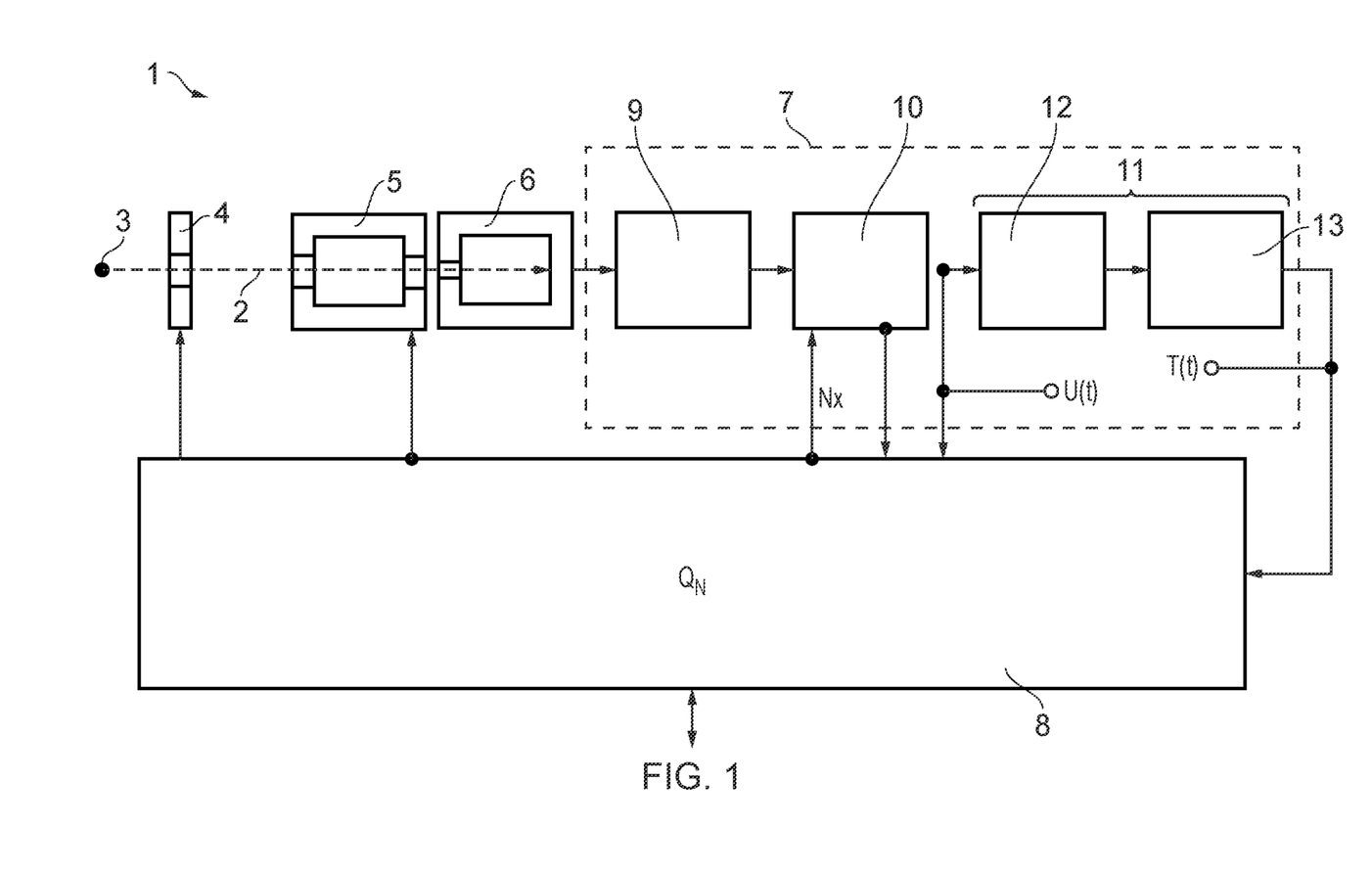
FIG. 1 is a schematic representation of a particle detector for detecting charged particles, comprising a measuring electrode, a detection device and an evaluation device.

FIG. 1 shows schematically the structure of a particle detector 1 for detecting charged particles 2, which in the example shown are ions. The charged particles 2 emanate from a particle source 3 which is arranged outside of the particle detector 1, for example in a chamber not shown in the drawing. The charged particles 2 enter the particle detector 1 from the environment via an aperture opening of an extraction device 4. A particle guide device 5 in the form of ion optics is used to conduct or guide the charged particles 2 from the extraction device 4 to a measuring electrode, which in the example shown is designed as a Faraday cup 6. The charged particles 2 propagate from the particle source 3 along a straight trajectory to the Faraday cup 6. The charged particles 2 entering at an input aperture of the Faraday cup 6 can be measured by the Faraday cup 6 with practically no backscattering.

Both the extraction device 4 and the particle guide device 5 can serve to filter the charged particles 2 so that only charged particles 2 with certain (known) mass-to-charge ratios can enter the Faraday cup 6. For the filtering, the extraction device 4 can, for example, have a Nielsen grid with metal grid structures. The particle guide device 6 can enable the charged particles 2 to be filtered, for example by a Fourier-based filtering method. In the event that the path between the extraction device 4 and the measuring electrode in the form of the Faraday cup 6 is small compared to the mean free path of the charged particles 2, the provision of the particle guide device 5 may be dispensed with.

The particle detector 1 also has a detection device 7 for detecting the charged particles 2 detected by the measuring electrode in the form of the Faraday cup 6 and an evaluation device 8 for determining the number of charged particles 2 detected by the detection device 7 (detection electronic unit).

In the example shown in FIG. 1, the detection device 7 is constructed as an analog circuit and should be arranged as close as possible to the Faraday cup 6.

The evaluation device 8 is used for digital processing of analog signals that are provided at the outputs of the detection device 7. For the digital processing in the evaluation device 8 (evaluation electronic unit), the analog signals are converted into digital signals with the aid of A/D converters (not shown). The evaluation device 8 can be connected to other digital devices, for example to a measuring computer or the like, with the aid of a digital interface indicated by a double arrow.

The detection device 7 of FIG. 1 has a charge amplifier 9 for converting a charge signal Q(t) generated by the charged particles 2 into a voltage signal U(t). An amplifier device 10 connected downstream of the charge amplifier 9 is used to generate an amplified voltage signal U(t) at the output of the amplifier device 10 (denoted by U(t) in FIG. 1).

Figure 2:
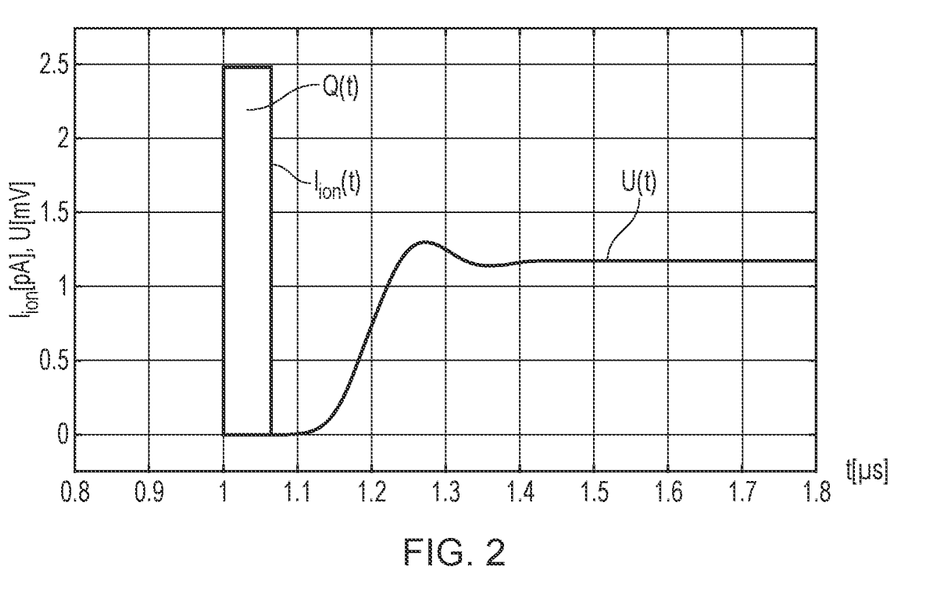
FIG. 2 is a schematic representation of a voltage signal at the output of an amplifier device of the detection device and a charge signal of a charged particle with an elementary charge, which is measured by the measuring electrode.

FIG. 2 shows the current $I_{ion}(t)$ when an elementary charge (a charged particle 2 with an elementary charge) impinges on the Faraday cup 6. The charge signal Q(t) forms the area under the current curve $I_{ion}(t)$ shown in FIG. 2. FIG. 2 also shows the amplified voltage signal U(t) at the output of the amplifier arrangement 10, which results from the charged particle 2 impinging with the elementary charge.

Figure 3:
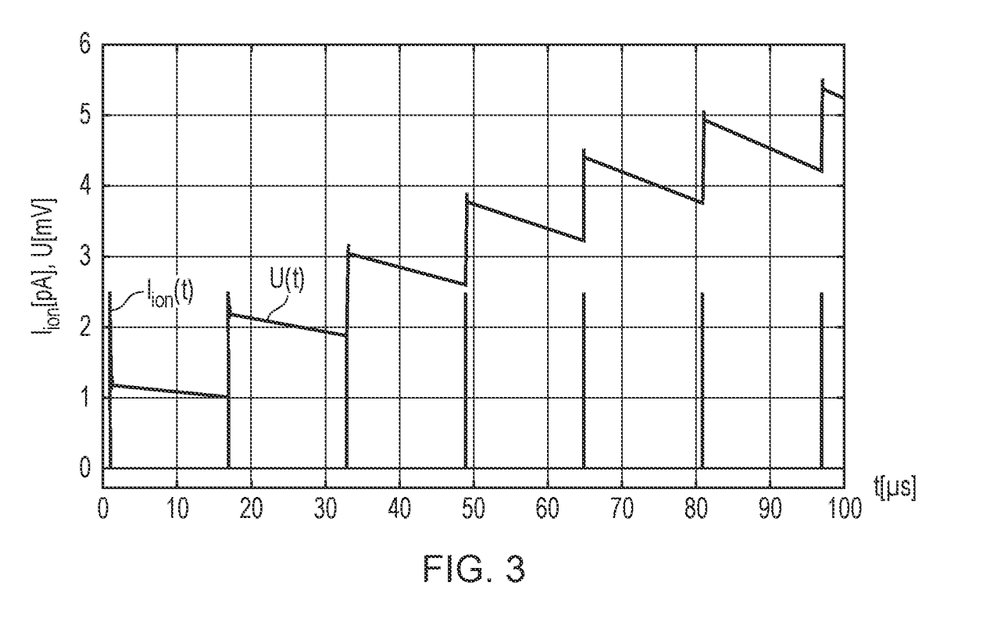
FIG. 3 is a schematic representation of the voltage signal from FIG. 2 in which a plurality of particles impinges on the measuring electrode at different measuring times.

FIG. 3 shows a representation analogous to FIG. 2 of the repeated impinging of charged particles 2 with an elementary charge on the Faraday cup 6. In the example shown in FIG. 3, the charged particles 2 impinge on the Faraday cup 6 with a constant period of 16 microseconds. As can be seen in FIG. 3, the voltage signal U(t) decreases after the impinging of a respective charged particle 2 because a discharge takes place via the electronic unit of the detection device 7.

In order to evaluate the voltage signal U(t) to determine the number (or, if the charge of the particles 2 is known, equivalent) of the total charge $Q_N$ of the charged particles 2 detected, it is advantageous if the voltage signal U(t) to minimize the noise is only evaluated in a respective counting window $dT_i$ (i=1, 2, ...) around a measuring or collision time $T_i$ of a respective charged particle 2 (or of several charged particles 2) at the Faraday cup 6. The collision time $T_i$ typically forms the middle of the time interval of the respective counting window $dT_i$, i.e. the counting window $dT_i$ extends from $T_i-dT_i/2$ to $T_i+dT_i/2$.

The definition of the counting window $dT_i$ can in principle take place in the evaluation device 8 by a suitable evaluation of the digitized voltage signal U(t).

Figure 4:
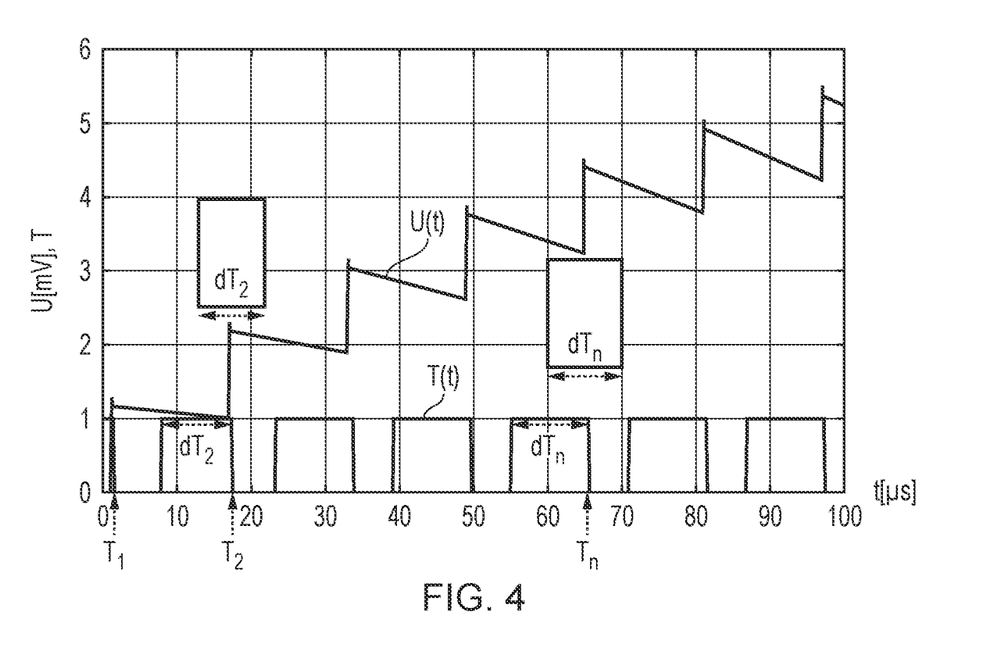
FIG. 4 is a schematic representation analogous to FIG. 3, in which a trigger signal and a plurality of counting windows for determining a respective number of charged particles impinging on the measuring electrode are shown.

In the example shown in FIG. 1, the particle detector 1 has a trigger device 11, more precisely a trigger circuit, for defining a respective counting window $dT_i$. Alternatively, the trigger device might be integrated and part of the evaluation device 8, determine a trigger signal from an analog or digital voltage signal. In the example shown, the trigger device 11 comprises a bandpass filter 12 for filtering the frequencies of the voltage signal U(t) relevant for triggering as well as a combined amplifier and trigger electronic unit 13, which in the example shown has a threshold switch in the form of a Schmitt trigger. The (binary) trigger signal T(t) present at the output of the trigger device 11 is also shown in FIG. 4. The switchover between the two binary states of the trigger signal T(t) occurs when the voltage signal U(t) exceeds or falls below a threshold value. The trigger signal T(t) thus also enables the collision times $T_i$ of the charged particles 2 on the Faraday cup 6 to be counted.

As can also be seen from FIG. 4, the trigger signal generated during triggering or the corresponding counting window $dT'_i$ determined by the trigger device 11 is in each case before the measuring time $T_i$ or, more specifically, the measuring time $T_i$ forms the end of the counting window $dT'_i$. To determine the number $Q_N$ of charged particles 2, the counting window $dT'_i$ is therefore shifted in time to later times by the evaluation device such that the counting window ($dT_i$) is around the respective measuring time $T_i$. Preferably, the counting window $dT_i$ is shifted by $dT_i/2$, so that the measuring time $T_i$ is in the middle of the counting window $dT_i$.

The counting windows $dT_i$ shown in FIG. 4 are selected to be comparatively long in order to clarify the representation; the duration of a respective counting window $dT_i$ is typically significantly shorter than shown in FIG. 4.

The voltage signal U(t) at the output of the amplifier device 10 is typically very noisy, particularly in the case of weak collisions (i.e. when a small quantity of particles 2 collide) at the Faraday cup 6. The noise is caused by the electronic unit, for example by the charge amplifier 9, as described in more detail below.

Figure 5:
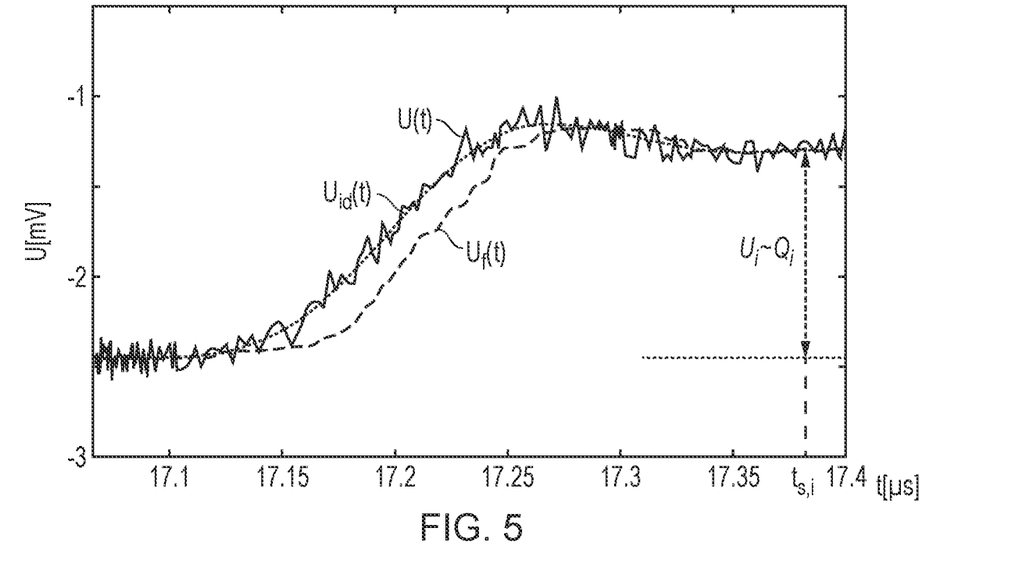
FIG. 5 is a schematic representation of the voltage signal in one of the counting windows of FIG. 4, in which a voltage difference is determined in order to determine the number of charged particles.

FIG. 5 shows the (noisy) voltage signal U(t) during a counting window $dT_i$, an ideal voltage signal $U_{id}(t)$ and a filtered voltage signal $U_f(t)$ that was generated by a sliding averaging of the voltage signal U(t) in order to increase the signal-to-noise ratio. Instead of sliding averaging, other noise-reducing algorithms can also be carried out by the evaluation device 8. For example, the typical shape of the voltage signal U(t) for a particular particle collision can be determined as a convolution term in order to improve the signal-to-noise ratio with the aid of known algorithms, for example wavelet or Fourier-based algorithms, for example by at least 10 dB or 20 dB.

To determine the number $Q_1$ of charged particles 2 impinging on the Faraday cup 6 in the respective counting window $dT_i$, a voltage difference $U_i$ in the voltage signal U(t), more precisely the filtered voltage signal $U_f(t)$, is determined before the measuring time $T_i$ and after the measuring time $T_i$, as shown in FIG. 5. The voltage difference $U_i$ is determined on the basis of a baseline in the form of a voltage level that the filtered voltage signal $U_f(t)$ has at the start of the counting window $dT_i$.

To determine the voltage difference $U_i$, the voltage signal U(t) in the example shown in FIG. 5 is evaluated after the measuring time $T_i$ at a sampling time $t_{s,i}$ within the respective counting window $dT_i$ around the last particle collision time, for which the following applies: $3/f_0 < t_{s,i} < 4.5/f_0$, wherein $f_0$ denotes a passage resonance frequency of the charge amplifier 9.

A sampling time $t_{s,i}$ which lies in the time interval specified above has proven to be advantageous for determining the number $Q_i$ of charged particles 2 in the respective time window $dT_i$, as will be explained below with reference to FIG. 6.

Figure 6:
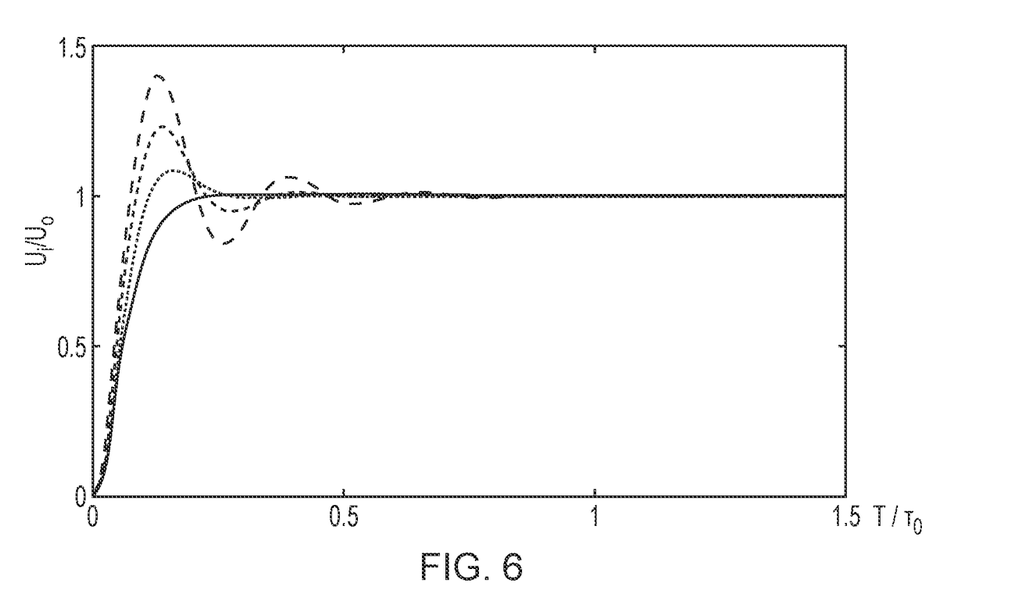
FIG. 6 shows schematic representations of an ideal voltage signal at the output of a charge amplifier of the detector device with different phase margins.

FIG. 6 shows the voltage signal $X_s(t)$ of an idealized (standardized) voltage jump $U_0$, wherein the following applies to the associated voltage signal $X_s(t)$:

$$X_s(t) = 1 - e^{-\alpha \omega_0 t} \cdot \left[ \cos\left(\sqrt{1-\alpha^2}\,\omega_0 t\right) + \frac{\alpha}{\sqrt{1-\alpha^2}} \sin\left(\sqrt{1-\alpha^2}\,\omega_0 t\right) \right]$$

wherein $\alpha$ forms a measurement for the phase margin of the charge amplifier 9 (with $0<\alpha<1$) and wherein $\omega_0$ denotes the passage circular resonance frequency of the charge amplifier 9 ($\omega_0 = 2\pi f_0$, wherein $f_0$ denotes the passage resonance frequency of the charge amplifier 9. The passage resonance frequency $f_0$ can for example be on the order of MHz, for example: $f_0=10$ MHz. In FIG. 6, the ideal voltage signal $X_s(t)$ is shown as an example for four values of the phase margin $\alpha=[0.900, 0.625, 0.425, 0.280]$. The sampling time $t_{s,i}$ should on the one hand be in the steady state of the charge amplifier 9, and on the other hand not be too long after the measuring time $T_i$. For the optimal sampling time $t_{s,i}$, the interval already specified above has proven to be advantageous: $1 < t_{s,i}/1.5$, with $T_0 \approx 3/f_0$.

In order to avoid that the steady state of the charge amplifier 9 is reached at a comparatively late point in time at which further particles may impinge on the Faraday cup 6, it has proven to be advantageous if the charge amplifier 9 has a phase margin of at least 45°, preferably at least 60°, as is the case in the example shown in FIG. 5. It has also proven to be advantageous if the charge amplifier 9 is a low-noise charge amplifier 9, which has a signal-to-noise ratio of at least 10 dB in a predetermined frequency interval of interest between a lower frequency $f_1$ and an upper frequency $f_2$.

The signal-to-noise ratio is defined as follows:

$$SNR = \frac{\Delta u_Q}{u_N} = \frac{\Delta u_Q}{\sqrt{\int_{f_1}^{f_2} e_N^2 \, df}}$$

wherein $\Delta_{uQ}$ denotes the useful voltage signal (in V) and $e_N^2$ denotes the noise component (in V/Hz) caused by the electronic unit of the charge amplifier 9. The lower frequency $f_1$ of the frequency range of interest is typically on the order of kHz, for example from approx. 20-100 kHz; the upper frequency $f_2$ of the frequency range of interest is typically on the order of MHz, for example 15 MHz or above.

Figure 7:
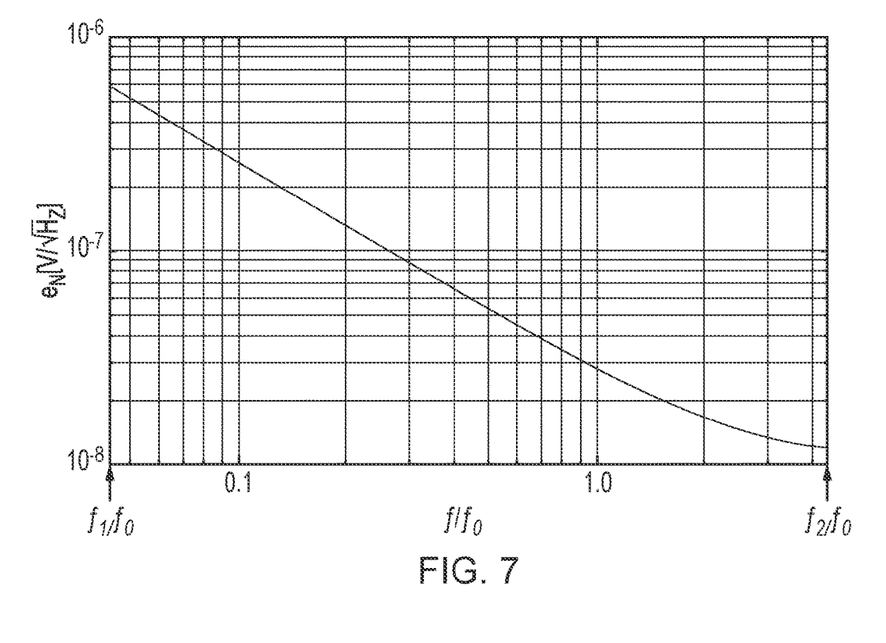
FIG. 7 is a schematic representation of the signal-to-noise ratio of the charge amplifier in a frequency interval of interest.

FIG. 7 shows typical noise behavior of the low-noise charge amplifier 9, or its frequency-dependent noise density $e_N$ within a frequency range between $f_1/f_0$ and $f_2/f_0$ standardized to the resonance frequency $f_0$ of the charge amplifier 9, wherein $f_0$ denotes the passage resonance frequency of the charge amplifier 9.

To determine the number of impinging particles 2 or the number of (elementary) charges $Q_N$ proportional to this number, the sum of the charges $Q_i$ collected in the respective counting windows $dT_i$ is formed, which is proportional to the voltage difference calculated in the manner described above.

With a charge-to-voltage conversion factor CF of the charge amplifier 9, which can, for example, be on the order of approx. 100 nV/As, the following results for the total charge $Q_N$ in N time windows $dT_i$ (1=1, . . . , N):

$$Q_N = \sum_{i=1}^{N} Q_i = \sum_{i=1}^{N} \frac{U_i}{10^{Nx} \cdot CF}$$

The factor $10^{Nx}$ forms the amplification factor of the amplifier device 10.

Since the voltage signal U(t) at the output of the amplifier device 10 increases steadily in the case of closely successive collisions of charged particles 2, but with a steady increase in the signal level the incline is lower, the base level also increases more slowly with increasing time or with an increasing number of collisions—in the worst case almost logarithmically. However, the voltage signal U(t) at the output of the amplifier device 10 always returns to the initial potential in the long term. It is therefore advantageous if the amplification factor $10^{Nx}$ of the amplification device 10 is adjustable.

In the amplifier device 10 shown in FIG. 1, the amplification factor $10^{Nx}$ is adjustable in stages over five decades (Nx=1, . . . 5), i.e. an amplification of $10^1$ to $10^5$ can be generated with the amplifier arrangement 10. For this purpose, the amplifier device 10 has, for example, five amplifier stages connected in series which are not shown in FIG. 1 for reasons of clarity. Each amplifier stage has an amplification factor of $10^1$ and can be switched on or off individually by the evaluation device 8. It is understood that the amplifier device 10 can have more or fewer amplifier stages and that the amplification factor of a respective amplifier stage does not necessarily have to be one decade ($10^1$).

As a function of the signal height (level) of the voltage signal U(t), the evaluation device 8 defines an optimal amplification factor $10^{Nx.opt}$ of the amplifier device 10, at which the voltage signal U(t) at the output of the amplifier device 10 is not overdriven. For this purpose, it is advantageous if the evaluation device 8 can read out a respective output of each of the five amplifier stages of the amplifier device 10. This is also advantageous so that the evaluation device 8 can carry out an automatic offset adjustment of the amplifier stages of the amplifier device 10 when a respective measurement is started. If necessary, the amplifier device 10 resets individual amplifier stages from overdrive to readiness for measurement.

Figure 8:
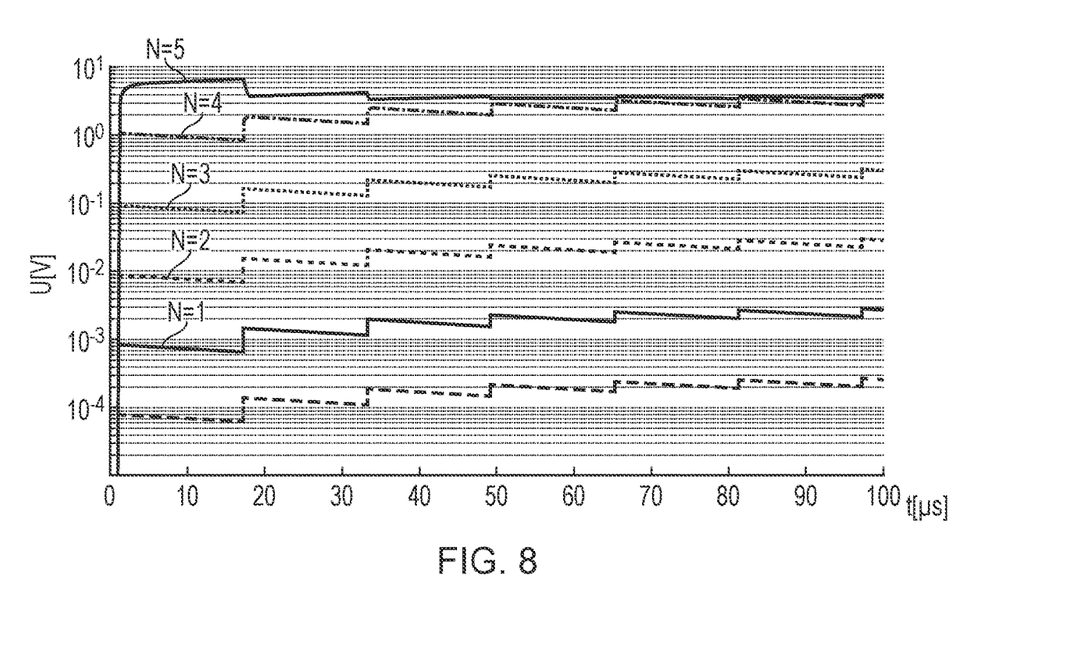
FIG. 8 is a schematic representation of the voltage signal at the output of the amplifier device with different amplification factors.
Figure 9:
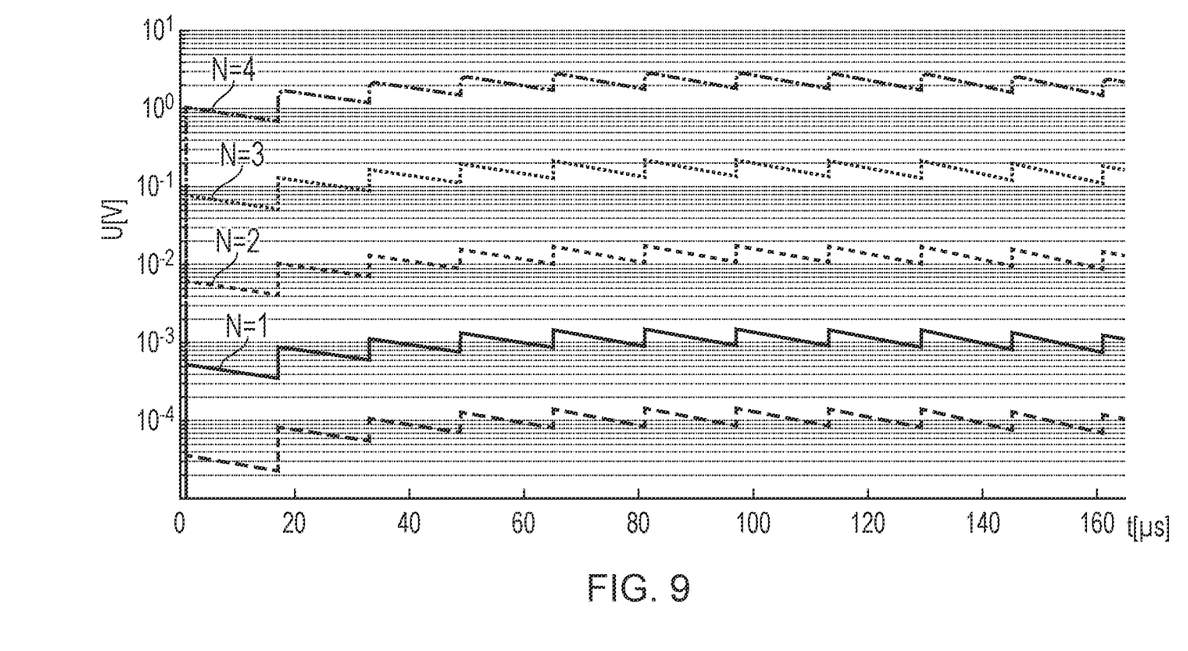
FIG. 9 is a schematic representation analogous to FIG. 8, in which the course of the voltage signal is shown over a longer period of time.

FIG. 8 shows that the optimal, non-overdriving amplification factor is $10^4$ both in the case that the number of charged particles 2 is elementary charges and in the case that there are approx. $10^5$ elementary charges (i.e. $N_{x,opt}$=4). FIG. 9 shows that the respective voltage signals U(t) at the output of the amplifier device 10 decrease again after an initial increase with an increasing number of collisions. With the amplifier device 10 with five amplifier stages, a dynamic range of the particle detector 1 of approximately five decades can thus be achieved. The amplifier device 10 therefore practically takes over the function of a secondary electron multiplier (SEM).

In summary, a particle detector 1 can be implemented in the manner described above, which on the one hand is robust and has a high stability thanks to the use of the Faraday cup 6 or a measuring electrode and on the other hand covers a high dynamic range of up to 5-6 decades. As an alternative to using a Faraday cup 6, another measuring electrode can also be used in order to measure the charged particles 2. For example, the charged particles 2 can be measured in a non-destructive manner, in that induction charges are measured using the measuring electrode 6.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A particle detector comprising:
a measuring electrode for measuring charged particles, a detection device for detecting the charged particles measured by the measuring electrode, and an evaluation device for determining the number of charged particles detected by the detection device, characterized in that the detection device has a charge amplifier for converting a charge signal generated on the measuring electrode by the charged particles into a voltage signal and an amplifier device for amplifying the voltage signal to form an amplified voltage signal;
wherein the evaluation device is designed to evaluate the amplified voltage signal in order to determine the number of charged particles detected by determining a voltage difference between a first voltage of the amplified voltage signal before a collision time of the charged particles at the measuring electrode and a second voltage of the amplified voltage signal after the collision time.

2. The particle detector according to claim 1, wherein the evaluation device is designed to filter the amplified voltage signal in order to increase the signal-to-noise ratio.

3. The particle detector according to claim 1, wherein the evaluation device is designed to determine the amplified voltage signal after the collision time at a sampling time in order to determine the voltage difference, for which the following applies: $3/f_0 < t_{s,i} < 4.5/f_0$, wherein $f_0$ denotes a resonance frequency of the charge amplifier.

4. The particle detector according to claim 1, wherein the charge amplifier is a low-noise charge amplifier which has a signal-to-noise ratio greater than 10 dB in a predetermined frequency interval.

5. The particle detector according to claim 1, wherein the charge amplifier has a phase margin of at least 45°, preferably of at least 60°.

6. The particle detector according to claim 1, wherein the amplifier device has an amplification factor which is adjustable by means of the evaluation device as a function of the voltage signal.

7. The particle detector according to claim 6, wherein the amplification factor is adjustable over at least four decades, preferably over at least five decades.

8. The particle detector according to claim 1, wherein the measuring electrode is designed as a Faraday cup.

9. The particle detector according to claim 1, further comprising: an extraction device for extracting the charged particles.

10. The particle detector according to claim 9, further comprising: a particle guide device for guiding the charged particles from the extraction device to the measuring electrode.

11. The particle detector according to claim 9, wherein the extraction device and/or the particle guide device are designed to filter the charged particles.

12. A particle detector comprising:
a measuring electrode for measuring charged particles,
a detection device comprising:
    a charge amplifier configured to convert a charge signal on the measuring electrode into a voltage signal;
    an amplifier for amplifying the voltage signal to form an amplified voltage signal; and
an evaluation device configured to evaluate the amplified voltage signal around a collision time of the charged particles at the measuring electrode in order to determine the number of charged particles detected by the detection device by determining a voltage difference between a first voltage of the amplified voltage signal before a collision time of the charged particles at the measuring electrode and a second voltage of the amplified voltage signal after the collision time.

* * * * *